United States Patent [19]

Wagner

[11] Patent Number: 5,452,127
[45] Date of Patent: Sep. 19, 1995

[54] ETALON WITH OPTICALLY POLARIZING FIELD ELECTRODES

[75] Inventor: Harvey L. Wagner, Royersford, Pa.

[73] Assignee: Martin Marietta Corporation, East Windsor, N.J.

[21] Appl. No.: 307,132

[22] Filed: Sep. 16, 1994

[51] Int. Cl.$^6$ .......................... G02B 27/00; G01B 9/02
[52] U.S. Cl. ..................................... 359/486; 356/352; 359/578; 359/579
[58] Field of Search ................ 356/352; 359/486, 577, 359/578, 579; 385/27

[56] References Cited

U.S. PATENT DOCUMENTS

| | | | |
|---|---|---|---|
| 3,510,200 | 5/1970 | Gordon | 359/578 |
| 3,930,718 | 1/1976 | Jensen | 356/352 |
| 4,247,166 | 1/1981 | Yeh | 356/352 |
| 4,767,194 | 8/1988 | Heppke et al. | 359/48 |
| 4,790,634 | 12/1988 | Miller | 356/352 |
| 4,818,661 | 4/1989 | Taylor et al. | 430/320 |
| 4,973,120 | 11/1990 | Jopson et al. | 356/352 |
| 5,062,684 | 11/1991 | Clayton et al. | 356/352 |
| 5,068,749 | 11/1991 | Patel | 356/352 |
| 5,073,004 | 12/1991 | Clayton et al. | 356/352 |
| 5,321,539 | 6/1994 | Hirabayashi et al. | 359/578 |

*Primary Examiner*—Martin Lerner
*Attorney, Agent, or Firm*—W. H. Meise; C. A. Berard; S. A. Young

[57] ABSTRACT

A Fabry-Perot etalon (310) has a cavity (12) occupied by an electric-field variable index of refraction material (22). The cavity is flanked by a pair of parallel mirrors (14), at least one of which is partially reflecting. At least one of the supporting substrates (18*l*) has deposited thereon a light polarizing field electrode (316*l*) which includes a plurality of mutually parallel, spaced apart electrical conductors (392) which define gaps (394). The electrical conductors are mutually interconnected by bus conductors (390), and may be connected by lead conductors (37) to an external voltage source, for generating the desired electric field across the cavity.

10 Claims, 3 Drawing Sheets

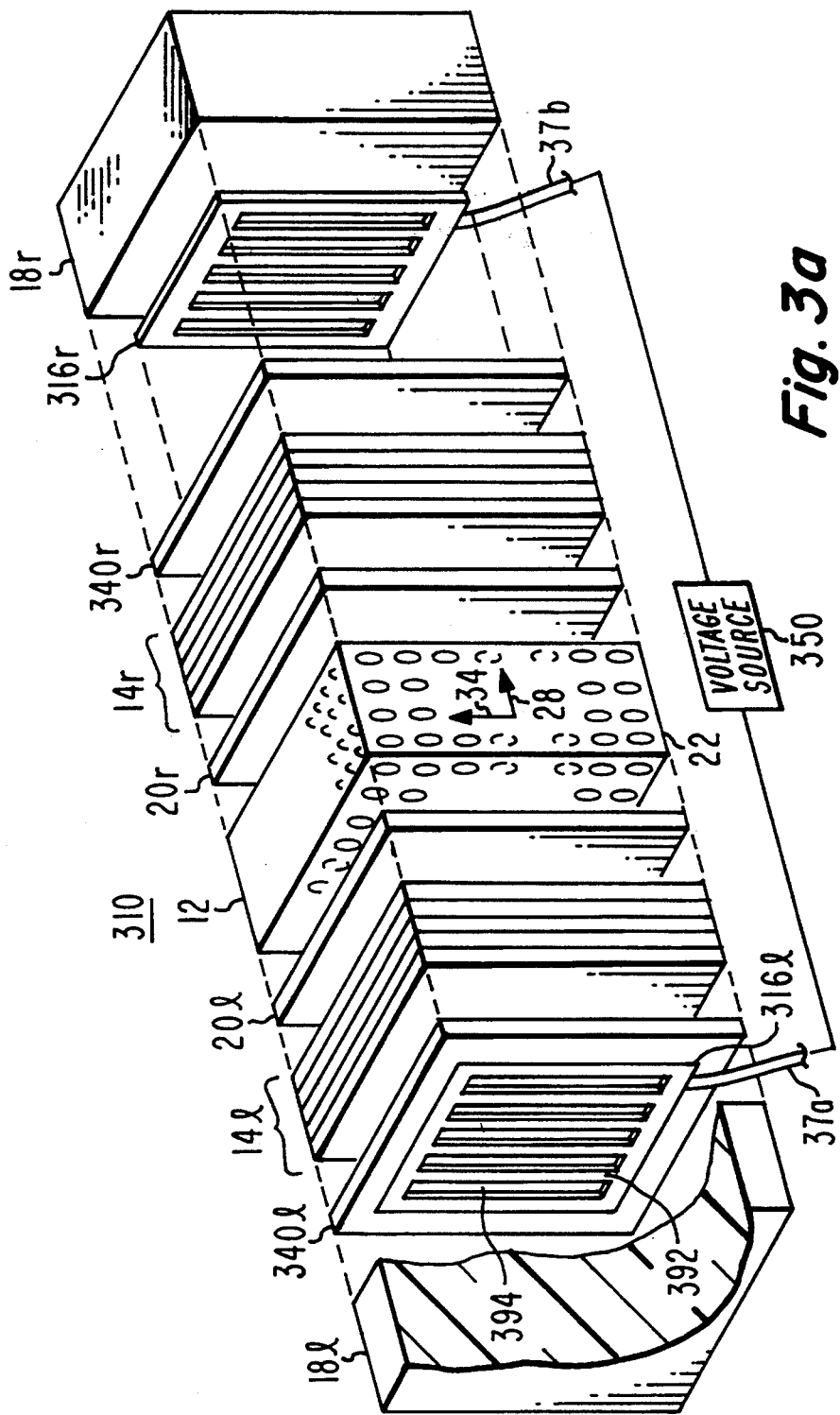

ETALON WITH OPTICALLY POLARIZING FIELD ELECTRODES

FIELD ELECTRODES

1. Field of the Invention

This invention relates to interference filters for light, and particularly to Fabry-Perot etalons which are tunable by use of electrically-controllable delay or index of refraction elements such as liquid crystals.

2. Background of the Invention

Light-wave carriers are increasingly being used for communications, for sensing, and for other uses. Operating upon light for these purposes requires various forms of light control elements corresponding to the components ordinarily used for radio-waves. A light control component which has some characteristics of a high-quality (Q) filter is the Fabry-Perot etalon, which is a form of interference filter. Fabry-Perot etalons for agile light color filtering are described, for example, in copending U.S. patent application Ser. No. 08/234,771, filed Apr. 28, 1994 in the name of H. Wagner. FIG. 1 illustrates a light color filter as described in the Wagner application. In FIG. 1, light color filter 10 is a tunable liquid-crystal Fabry-Perot etalon, also known generally as a Fabry-Perot interferometer, tunable etalon, resonant cavity interferometer, and the like. Color filter 10 of FIG. 1 includes transparent silica or quartz left and right substrates 18$l$ and 18$r$, respectively, which preferably have mutually parallel interior surfaces. The inside surfaces of substrates 18$l$ and 18$r$ are each coated with a layer 16$l$, 16$r$, respectively, of transparent electrical conductor material, which may be, for example, tin oxide or indium-tin oxide. Conductive layer 16$r$ is connected to ground, and conductive layer 16$l$ is connected to a conductor 37 for receiving voltages which change in accordance with commands, as described in more detail in the aforementioned Wagner patent application. A partially transparent or semitransparent reflector 14$l$ overlies electrically conductive layer 16$l$, and a similar semitransparent reflector 14$r$ overlies conductor 16$r$. Such a semitransparent reflector layer corresponds conceptually to a "half-silvered" or "one-way" mirror, but such half-silvered mirrors tend to have high attenuation or loss. Instead, semitransparent reflector layers 14$l$ and 14$r$ are layered dielectrics, known in the art for low loss, selected to produce the desired semi-transparency and reflectivity. A cavity 12 lying between semitransparent reflectors 14$l$ and 14$r$ is filled with liquid crystal material, the molecules of which are represented by ovals 22.

The molecules of the liquid crystal material tend to align themselves with the adjacent molecules, but the alignment of the liquid crystal molecules which provides the voltage-dependent birefringence depends upon introduction of alignment sites. Alignment sites are provided by left and right alignment coatings 20$l$ and 20$r$ supported by dielectric layers 14$l$ and 14$r$, respectively. Coatings 20$l$ and 20$r$ are polyimide layers, brushed to create minute parallel grooves or stripes, which tend to align the liquid crystal molecules parallel with the grooves. As illustrated in FIG. 1, the direction of brushing is such as to make vertically oriented grooves in polyimide layers 20$l$ and 20$r$, which tend to align the liquid crystal molecules 22 in a vertical direction, as suggested by arrow 24. With the liquid crystal molecules at the surfaces of layers 20$l$ and 20$r$ oriented vertically, the adjacent liquid crystal molecules also tend to be aligned vertically, and as a result, the vertical alignment extends through the entire liquid crystal cell.

As known to those skilled in the art, the vertical polarization of the liquid crystal molecules as described in conjunction with FIG. 1 results in different indices of refraction for different light polarizations passing through the liquid crystal cell. Light (represented in FIG. 1 by a photon symbol 6) in which the electric field component is oriented parallel to the preferred orientation of the liquid crystal molecules (light polarized as suggested by arrow 8) tends to be slowed more than light in which the electric field component is perpendicular to the liquid crystal molecules (represented by arrowhead 9), and the different velocities of propagation are indicative of different indices of refraction.

When a control voltage is applied across (or between) conductive layers 16$l$, 16$r$ of liquid crystal etalon cell 10 of FIG. 1 by means of conductor 37 and ground, the vertically oriented liquid crystal molecules tend to align themselves with the electric field resulting from the applied voltage. The electric field direction is indicated by an arrow 28. Thus, the molecules of the liquid crystal material tend to rotate from the vertical position which they occupy in an unenergized state to a horizontal position (not illustrated). In the horizontal position, the liquid crystal molecules present a lower index of refraction (higher velocity of light propagation) than when in the vertical position 24 described above, and this lower index of refraction tends to be near the index of refraction which the molecules in their unenergized, vertically oriented state 24 present to horizontally-polarized light components 9. As a result, the liquid crystal cell or cavity 12 of FIG. 1 provides a significant change of index of refraction to vertically polarized components 8 of light when energized and deenergized, but presents a much smaller change of index of refraction to horizontally polarized components 9. If an unpolarized detector is used to detect the light operated on by the etalon 10 of FIG. 1, the effects attributable to the vertical component are averaged with the effects attributable to the horizontal component, which results in a "dilution" of the desirable voltage variable birefringence of the cell, and its resulting light filtering characteristics.

In many contexts, it will be desirable to maximize the desirable controllable attributes of the etalon, by eliminating the presence of the cross-polarized light component. This may be accomplished, as described in the above-mentioned Wagner application, by placing a polarized light filter, illustrated as 26 in FIG. 1, before the etalon. In FIG. 1, the light filter 26 is vertically polarized, to pass vertically polarized light components 8, and to reject horizontally polarized light components 9. FIG. 2 is a perspective or isometric view of a possible embodiment of transparent substrate 18$l$ and a vertical conductive-grid or wire-grid polarizing filter 26. As illustrated in FIG. 2, the vertically oriented stripes have a stripe width of about 0.4$\mu$ and an inter-stripe separation of about 1$\mu$, for polarizing light at a wavelength of 2$\mu$, which falls into the near-infrared range. In general, the stripe width should be about 0.2 of a wavelength $\lambda$, and the inter-stripe spacing should be 0.5$\lambda$. The stripes may be of any electrically conductive material such as a metal.

SUMMARY OF THE INVENTION

A tunable Fabry-Perot etalon according to the invention comprises a material having an index of refraction which is variable in response to an electric field. The material also has first and second mutually parallel planar surfaces. In the case of liquid crystal material or other liquid material, the mutually parallel surfaces are defined by the cell or container walls. The etalon also includes first and second mirrors lying parallel to the first and second mutually parallel planar surfaces, and having the material sandwiched therebetween. At least one of the first and second mirrors is partially reflecting and partially transmitting. A light polarizing electrical conductor includes a regular grid of electrically interconnected, mutually parallel, spaced-apart electrical conductors. A coupling and smoothing arrangement couples the light polarizing electrical conductor to that surface of the first mirror which is remote from the material with the electric-field-variable index of refraction, and fills the region between the conductors of the grid to prevent scattering of light or other effects. A second light-passing electrical conductor is affixed to that surface of the second mirror which is remote from the electric-field-variable material. The etalon also includes an electrical coupling arrangement coupled to the light polarizing and second electrical conductors, for applying voltage or electricity to the light polarizing and second electrical conductors for generating an electrical field for controlling the index of refraction of the material, whereby light entering the first mirror and passing through the material, reflecting from both mirrors, is filtered at a light wavelength which is controlled in response to the voltage or electricity. In a particular embodiment of the invention in which the field-variable material is liquid crystal material, the etalon may include an arrangement for aligning the molecules of the liquid crystal material, such as a layer of brushed material adjacent the liquid crystal material having minuscule grooves to aid in aligning its molecules. The alignment may be parallel to the conductors of the grid of conductors of the polarizing conductor. The brushed material may be polyimide. The second light-passing electrical conductor may be identical to the light polarizing electrical conductor, or it may be a sheet of transparent electrical conductor such as indium-tin oxide. For operation in the near-infrared region, the mutually parallel conductors of the light polarizing electrical conductor are each about $0.4\mu$ wide, and spaced apart by about $1\mu$, while for far-infrared, the width is about $2\mu$ and the spacing is about $5\mu$.

DESCRIPTION OF THE DRAWINGS

FIG. 3a is a simplified, exploded perspective or isometric view of an etalon according to the invention, partially cut away to reveal details, which etalon uses a polarizing filter/field electrode.

DESCRIPTION OF THE INVENTION

Figure 1:
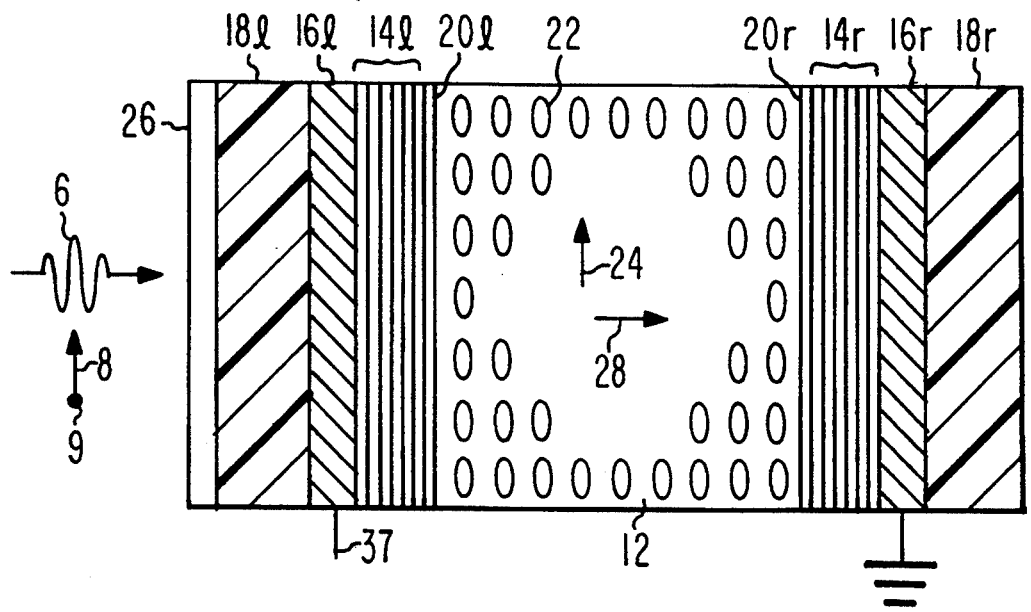
FIG. 1 is a simplified cross-section of a prior-art Fabry-Perot etalon in which the wavelength is tunable in response to an electrical field applied to a liquid crystal material within the cavity of the etalon.
Figure 2:
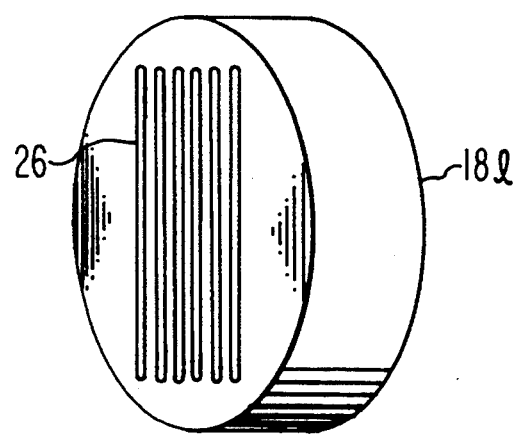
FIG. 2 is a simplified representation of a prior-art light polarizing filter attached to a transparent substrate.
Figure 3B:
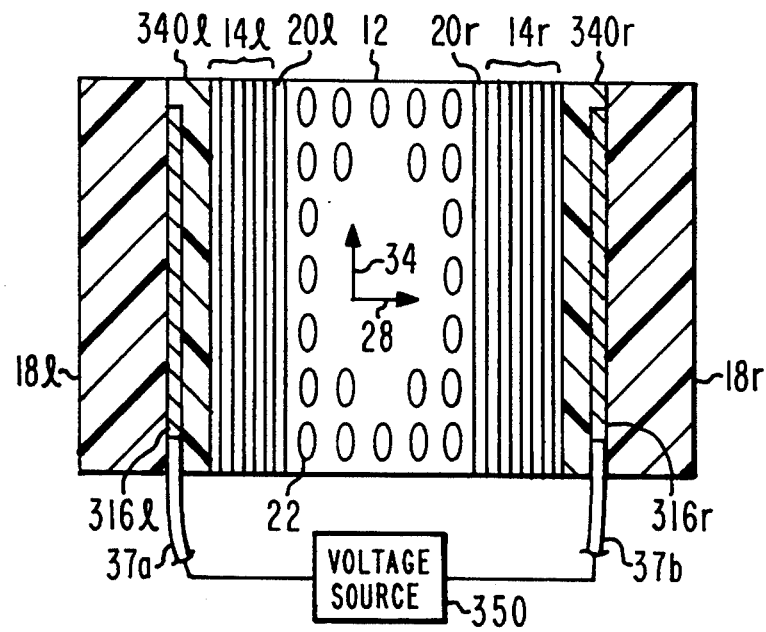
FIG. 3b is a cross-section thereof in its assembled form.

FIGS. 3a and 3b illustrate a Fabry-Perot etalon according to the invention. In FIGS. 3a and 3b, elements corresponding to those of FIGS. 1 and 2 are designated by like reference numerals. The etalon of FIGS. 3a and 3b includes the electric-field variable material in cavity 12. The preferred material is liquid crystal material. Since the material is liquid, it takes on the shape of the cavity within which it is contained. The sides which are of optical interest are the right and left sides of the cavity, which are defined by the brushed polyimide layers 20l and 20r. The brushed polyimide layers 20l and 20r are, in turn, supported by the dielectric mirrors 14l and 14r, respectively. The dielectric mirrors, in turn, are ultimately supported by mutually parallel transparent substrates 18l and 18r.

Figure 4:
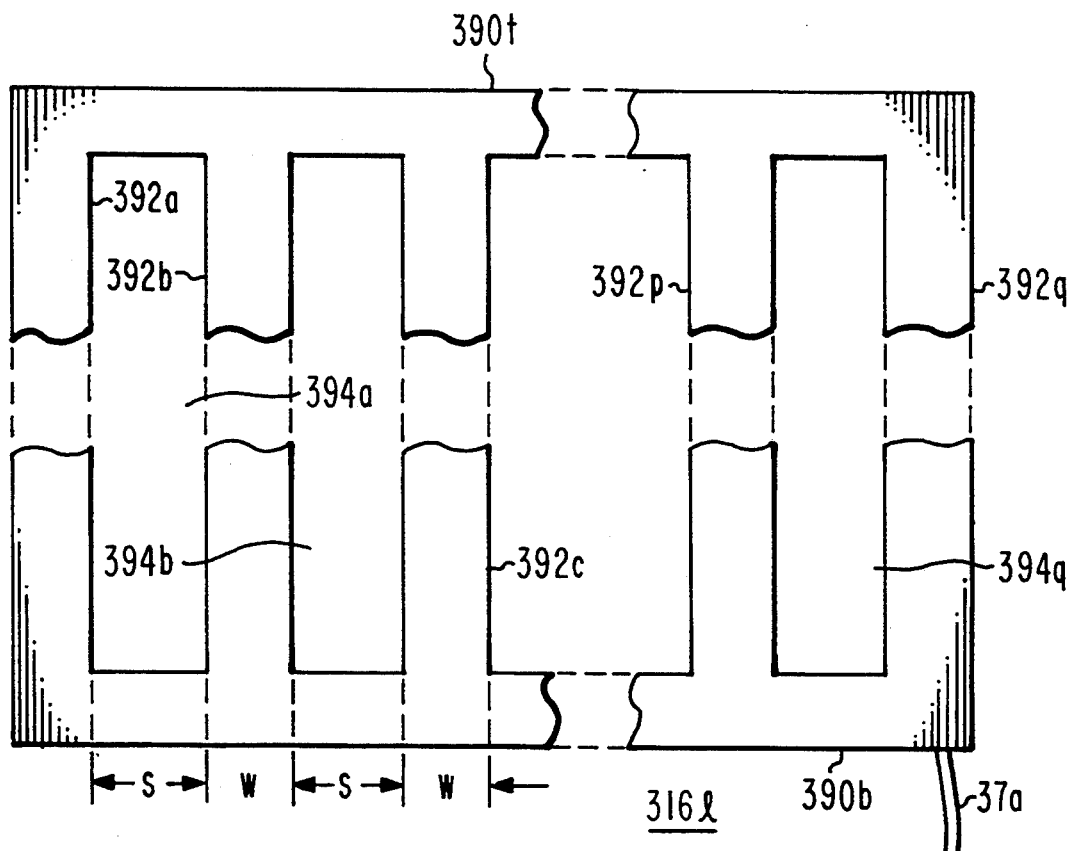
FIG. 4 is a partial view of the morphology of the polarizing filter/field electrode of the arrangement of FIGS. 3a and 3b.

A combination light polarizer/field electrode 316l lies between left substrate 18l and left dielectric filter 14l. As illustrated in FIGS. 3a, 3b and 4, the light polarizer/field electrode 316l is in the form of a rectangular grid of mutually parallel electrical conductors 392a, 392b, 392c, . . . 392q, which together define spaces or gaps 394a, 394b, . . . , 394q. Light polarizer/field electrode 316l may be in the form of a metallic conductor such as copper, silver or gold, deposited on the associated substrate 18l to a depth sufficient for opacity to light. The width and spacing of the grid conductors depends upon the wavelength of the light which is to be polarized. For near-infrared light with a wavelength of about $2\mu$, the conductor width should be about $0.4\mu$, and the spacing should be about $1\mu$. For far-infrared light with a wavelength of about $10\mu$, the conductor width should be about $2\mu$, and the spacing should be about $5\mu$.

When the conductors of the light polarizer/field electrode are applied to the smooth surface of the substrate, the combined surface may no longer be optically smooth, if the conductors are thick. This may result in nonparallelism of at least portions of the optical cavity, since the dielectric mirrors 14 and the molecule alignment layers 20 are supported by the substrate and the conductors applied thereto. The problem of nonparallelism, should it occur, is solved by a smoothing layer 340 of dielectric material applied over the conductors of the light polarizer/field electrode. More particularly, a smoothing layer 340l is applied over the conductors lying on left substrate 18l, to fill in the gaps between the conductors. This layer may be applied with a sufficiently low viscosity to flow evenly and form a smooth, flat surface as it dries, or it may be viscous as applied, and be smoothed after drying. As an alternative, the smoothing layer could be applied as a vacuum-deposited film. However fabricated, the smoothing layer 340l fills in the gaps with a dielectric material having an index of refraction similar to that of the adjacent substrate, and prevents light scattering such as might occur if the grid spaces were empty. At the left of FIG. 3a, the conductor grid 316l is illustrated as being imbedded in the smoothing layer 340l, while at the right side of FIG. 3a, the conductor grid 316r is illustrated as being exploded away from its associated smoothing layer 340r.

Referring to FIG. 4, the mutually parallel electrical conductors 392a, 392b, 392c, . . . , 392q are each connected at their tops to a top bus conductor 390t, and at their bottoms to a bottom bus conductor 390b. Bottom bus 390b is, in turn, connected to electrical lead conductor 37a.

Referring once again to FIGS. 3a and 3b, a voltage source 350 is illustrated as being connected to leads 37a and 37b, for controllably generating a voltage across (or between) the polarizing filter/field electrodes 316l and 316r, which voltage in turn creates the desired electric field configuration within cavity 12, which field configuration is represented by arrow 28 in FIGS. 3a and 3b.

The described arrangement has the advantages of simplicity, since the field electrodes needed in the prior art are combined into another structure which is also required, which also results in lower losses, due to fewer layers through which the light must pass. Also, in mid and far IR applications, transparent electrode materials are difficult to produce in low-loss configurations. This embodiment provides for a further reduction in loss by combining the electrode function into a structure with potentially very low loss.

Other embodiments of the invention will be apparent to those skilled in the art. For example, a polarizer according to the invention may be used in conjunction with the first one of a cascade of etalons. While the single polarizing field electrode of the invention has been described as being associated with the input light port of the etalon, it could as easily be associated with the output port instead; only if nonlinear effects occur due to large amounts of light power would the input location be advantageous. While liquid crystal is the preferred field-variable optical material, known solid field-variable materials may be used, in which case the solid material itself must have the smooth surfaces to which the mirrors are attached. While dielectric mirrors have been described and illustrated, in the case of a transmissive etalon, the mirrors could as well be partially reflective metallic mirrors, or, in the case of a reflective etalon, a combination of partially reflective and totally reflective mirrors, either dielectric or metallic. While a rectangular grid array has been described and illustrated, a circular or elliptical array, or any other shape, may be used as desired, or to conform to the shape of the optical surface.

What is claimed is:

1. An etalon, comprising:
    a material having an index of refraction which is variable in response to an electric field, said material also having first and second mutually parallel planar surfaces;
    first and second mirrors lying parallel to said first and second mutually parallel planar surfaces, and having said material sandwiched therebetween, at least one of said first and second mirrors being partially reflecting and partially transmitting;
    a light polarizing electrical conductor comprising a regular grid of electrically interconnected mutually parallel, spaced-apart electrical conductors;
    coupling means for mechanically coupling said light polarizing electrical conductor to a first surface of one of said first and second mirrors;
    a second light-passing electrical conductor supported by a first surface of the other one of said first and second mirrors; and
    electrical coupling means coupled to said light polarizing and second electrical conductors, for applying electricity to said light polarizing and second electrical conductors for generating an electrical field for controlling said index of refraction of said material, whereby light entering said one of said first and second mirrors and passing through said material is filtered at a light wavelength which is controlled in response to said electricity.

2. An etalon according to claim 1, wherein said material is liquid crystal material, and said etalon further comprises:
    liquid crystal molecule alignment means, for tending to align said molecules of said liquid crystal material parallel to said mutually parallel conductors of said grid.

3. An etalon according to claim 2, wherein said liquid crystal molecule alignment means comprises a brushed layer in contact with said liquid crystal material.

4. An etalon according to claim 3, wherein said brushed layer is polyimide material.

5. An etalon according to claim 1, wherein said second light-passing electrical conductor is identical to said light polarizing electrical conductor.

6. An etalon according to claim 1, wherein said mutually parallel conductors of said light polarizing electrical conductor are each about $0.4\mu$ wide, and spaced apart by about $1\mu$.

7. An etalon according to claim 1, wherein said mutually parallel conductors of said light polarizing electrical conductor are each about $2\mu$ wide, and spaced apart by about $5\mu$.

8. An etalon according to claim 1, further comprising:
    smoothing means associated with said coupling means, for filling the region between said conductors of said grid to prevent scattering.

9. An etalon according to claim 1, wherein said first surface of said one of said first and second mirrors is that one of said surfaces of said one of said first and second mirrors which is remote from said material.

10. An etalon according to claim 1, wherein said first surface of said other one of said first and second mirrors is that surface which is remote from said material.

* * * * *